United States Patent [19]

Bielfeldt

[11] Patent Number: 4,611,983

[45] Date of Patent: Sep. 16, 1986

[54] INJECTION PRESS FOR USE IN A TRANSFER MOLDING SYSTEM

[75] Inventor: Friedrich B. Bielfeldt, Eppingen-Mühlbach, Fed. Rep. of Germany

[73] Assignee: Maschinenfabrik J. Dieffenbacher GmbH, Eppingen, Fed. Rep. of Germany

[21] Appl. No.: 657,562

[22] Filed: Oct. 1, 1984

[30] Foreign Application Priority Data

Oct. 4, 1983 [DE] Fed. Rep. of Germany ....... 3336080

[51] Int. Cl.⁴ ................................................ B29C 45/02
[52] U.S. Cl. .............................. 425/544; 264/328.4; 264/328.5; 425/557; 425/559; 425/562; 425/586; 425/256; 425/DIG. 228
[58] Field of Search ............... 425/544, 553, 557, 562, 425/563, 585, 586, 587, DIG. 228, 559, 560, 561, 256; 264/328.4, 328.5, 167

[56] References Cited

U.S. PATENT DOCUMENTS 3,392,217  7/1968  Zitzloff ............................. 425/544
4,372,741  2/1983  Cane et al. ........................ 425/562

Primary Examiner—Jay H. Woo
Assistant Examiner—Timothy W. Heitbrink
Attorney, Agent, or Firm—Schwartz, Jeffery, Schwaab, Mack, Blumenthal & Evans

[57] ABSTRACT

Disclosed is an injection press for use in a transfer molding system for fiber reinforced thermo-setting resins, comprising an injection piston, an injection cylinder in which the injection piston moves, a feed bore which traverses the injection cylinder, a sprue orifice which leads into the mold, a telescoping sleeve which serves to seal off the feed bore when the piston travels toward the sprue orifice, wherein the injection piston seals the transfer bore at the end of the stroke near the sprue orifice, and wherein said feed bore is open when the piston is in a position a stroke length away from the sprue orifice.

7 Claims, 1 Drawing Figure

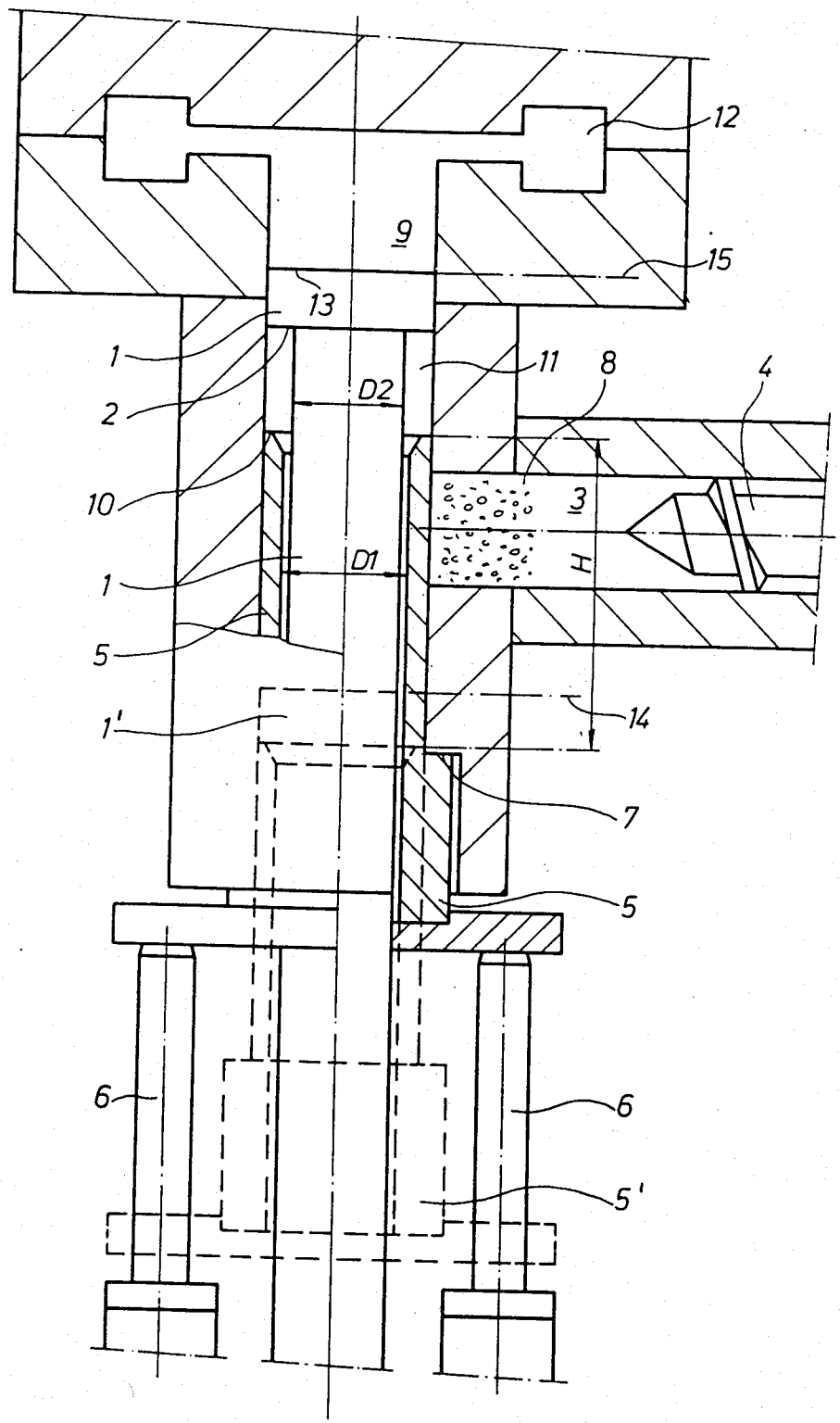

# INJECTION PRESS FOR USE IN A TRANSFER MOLDING SYSTEM

BACKGROUND OF THE INVENTION

1. Field of the Invention

The invention relates to an injection press, and more particularly to an injection press for use in a transfer molding system for fiber reinforced, thermo-setting resins.

2. Prior Art

In injection presses of the specified type, the resin-fiber mixture is deposited in a mold cavity from above by hand, or by means of a semi-automatic loading assembly. The mold is then sealed, and the injection piston moves up and displaces the mixture in the mold cavity. In automatic feeding through a bore hole disposed to the side, the resin-fiber mixture is pressed through an open injection bore hole with a lowered injection piston. The injection piston in such an injection press has free rotation, i.e., only the front part of the injection piston has a diameter such that it has a sliding fit in the injection cylinder. The rear section of the injection piston is produced with a substantially smaller diameter and forms an annular clearance. This is necessary because resin residues lead to the seizing of an injection piston produced with a continuously equal diameter.

A disadvantage discovered with injection presses with freely rotating injection pistons is that a mass of resin can force its way into the annular clearance. Such losses of resin bring about uneven dosage quantities and thereby flaws in the molded article.

SUMMARY OF THE INVENTION

It is an object of the invention to produce an injection press in which the above mentioned disadvantages are avoided.

This object is met by the features of the injection press according to the invention. Leakage of the resin mass out of the injection cylinder is successfully prevented by the telescoping sheath according to the invention.

In accomplishing the foregoing object, there has been provided in accordance with the present invention an injection press for use in a transfer molding system for fiber reinforced thermo-setting resins, comprising an injection piston, an injection cylinder in which the injection piston moves, a feed bore which traverses the injection cylinder, a sprue orifice which leads into the mold, a telescoping sleeve which serves to seal off the feed bore when the piston travels toward the sprue orifice, wherein the injection piston seals the sprue orifice at the end of the stroke near the sprue orifice, and wherein said feed bore is open when the piston is in a position a stroke length away from the sprue orifice. Thermo-setting resins which may be compatible with the device are, among others, phenol-melamine and polyester resins. Usually, the injection piston comprises a front section in sliding engagement with the injection cylinder and a rear section which defines an annular clearance between the piston and the injection cylinder, which rear section defines a shoulder between the annular clearance and said front section.

Preferably, the injection press according to the invention further comprises an elastic spring means for continuously keeping the telescoping sleeve under hydraulic driving pressure in the direction of the transfer bore, wherein the shoulder of the injection piston forcibly engages the telescoping sleeve and drives it back as the piston moves away from the transfer bore.

In a preferred embodiment, the injection press further comprises catch means for limiting the stroke length of the telescoping sleeve. In this embodiment, the inner diameter of the telescoping sleeve is greater than the outer diameter of the rear section of the injection piston; the telescoping sleeve further comprises a sharp annular edge facing the front section of the injection piston; and the elastic spring means comprises a battery system which drives the telescoping sleeve by means of a hydraulic piston.

BRIEF DESCRIPTION OF THE DRAWING

Further objects, features and advantages of the present invention will become apparent from the detailed description of preferred embodiments which follows, when considered together with the attached FIGURE of drawing, wherein:

The FIGURE shows a cross-section of an injection press according to the invention.

DETAILED DESCRIPTION OF THE PREFERRED EMBODIMENT

The drawing shows an injection piston 1 in an upper position 15 as it seals a sprue orifice 13. If the injection piston 1 is in the lower position 14 in the drawing, a feed bore hole 3 which traverses an injection cylinder 9 is freed for the filling process in a mold cavity 12. When the filling process has ended, the injection piston 1 proceeds again from position 14 to position 15, i.e., to the upper filling position of the sprue orifice 13. As the injection piston 1 rises, a telescoping sleeve 5, which is continually under upward actuating pressure by means of an actuating piston 6, is also drawn up and thereby seals the feed bore 3. The path of the telescoping sleeve 5 is therefore limited by a catch 7 to the stroke length H. As the injection piston 1 departs from position 15 against the actuating pressure of the piston 6 to position 14, it takes the telescoping sleeve 5 with it by means of its shoulder 2. The feed bore 3 therefore remains sealed in the moving phase, as the injection piston 1 moves from position 15 to the upper limit of the stroke of the telescoping sleeve 5. The feed bore 3 also remains sealed in the upper stationary phase. The inner sleeve diameter D1 of the telescoping sleeve 5 is designed to be somewhat larger than the diameter D2 of the injection piston 1. This allows the resin residue to overflow out of the ring clearance 11 by means of a slit as the injection piston 1 is raised. The telescoping sleeve 5 is provided with a sharp annular edge 10 to better scrape the annular clearance 11 free of resin residue. It is advisable to design the telescoping sleeve 5 as an elastic spring element actuated by a battery system by means of hydraulic piston 6.

The unbroken lines show injection piston 1 and the telescoping sleeve 5 in the upper position 15, i.e., during curing. The dashed lines represent injection piston 1' and the telescoping sleeve 5' in the lower position 14, i.e., during the filling process.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. An injection press for use in a transfer molding system for fiber reinforced, thermo-setting resins, comprising:
   (a) an injection piston;
   (b) an injection cylinder in which the injection piston moves;
   (c) a feed bore traversing the injection cylinder;
   (d) a sprue orifice leading into a mold;
   (e) a telescoping sleeve sealing off the feed bore when the piston travels toward the sprue orifice, wherein the injection piston seals the sprue orifice upon completing a stroke near the sprue orifice, and wherein the feed bore is open when the piston is in a position a stroke length away from the sprue orifice.

2. An injection press according to claim 1, wherein the injection piston comprises:
   (a) a front section in sliding engagement with the injection cylinder; and
   (b) a rear section which defines an annular clearance between the piston and the injection cylinder, and which defines a shoulder between the annular clearance and said front section.

3. An injection press according to claim 2, further comprising an elastic spring means for continuously keeping the telescoping sleeve under hydraulic driving pressure in the direction of the transfer bore, wherein the shoulder of said injection piston forcibly engages the telescoping sleeve and drives it back as the piston moves away from the transfer bore.

4. An injection press according to claim 1, further comprising catch means for limiting the stroke length of the telescoping sleeve.

5. An injection press according to claim 1, wherein the inner diameter of the telescoping sleeve is greater than the outer diameter of the rear section of the injection piston.

6. An injection press according to claim 2, wherein the telescoping sleeve further comprises a sharp annular edge facing the front section of the injection piston, the sharp annular edge serving to scrape the annular clearance free of resin.

7. An injection press according to claim 3, wherein the elastic spring means comprises a battery system which drives the telescoping sleeve by means of a hydraulic piston.

* * * * *